United States Patent [19]

Jeppson

[11] 4,035,659

[45] July 12, 1977

[54] ELECTRICAL POWER-GENERATION APPARATUS WITH ROTARY VOLTAGE TRANSFORMER AND INTEGRATED INERTIAL ENERGY STORAGE

[76] Inventor: Morris R. Jeppson, P.O. Box 4943, Carmel, Calif. 93921

[21] Appl. No.: 623,975

[22] Filed: Oct. 20, 1975

[51] Int. Cl.² ........................................ H02K 17/44
[52] U.S. Cl. .................................. 307/84; 310/74; 322/4
[58] Field of Search ............ 322/4; 310/74; 307/84, 307/43, 44, 47, 153, 150, 149

[56] References Cited
U.S. PATENT DOCUMENTS

| | | | |
|---|---|---|---|
| 2,747,155 | 5/1956 | Caputo et al. | 322/4 |
| 3,296,451 | 1/1967 | Van Ausdal et al. | 322/4 |
| 3,609,426 | 9/1971 | Gaul | 310/74 |

*Primary Examiner*—Herman Hohauser
*Attorney, Agent, or Firm*—Phillips, Moore, Weissenberger, Lempio & Majestic

[57] ABSTRACT

Generating stations which each have a rotary voltage step-up mechanism integrated with an inertial energy storage device are connected in series through a transmission line to produce high-voltage utility electrical power from distributed primary energy sources, such as arrays of solar energy panels, wind-driven generators or the like, which may be intermittent. Each station in the series may include an elevated generator supported on insulative structure and operating at the high-voltage level of the transmission line to add an increment of voltage and power to the line. The generator is driven through an insulative drive shaft by a motor operated from the nearby primary energy sources. Each station further includes a massive flywheel secured to the drive shaft assembly that links the generator and motor in order to store locally developed energy during periods of excess supply whereby energy may be continued to be delivered to the transmission line during periods of diminished supply or to meet demand peaks.

17 Claims, 2 Drawing Figures

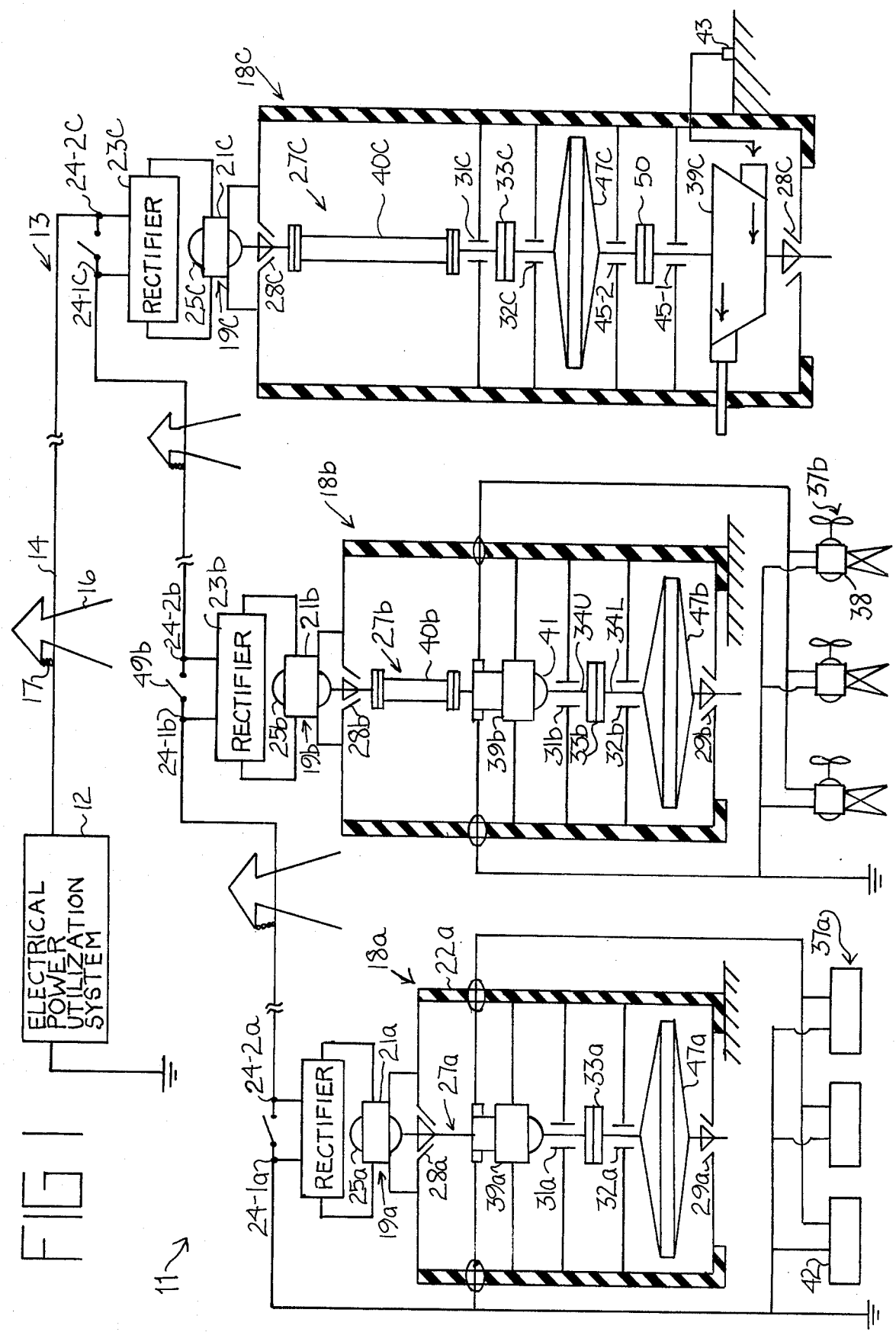

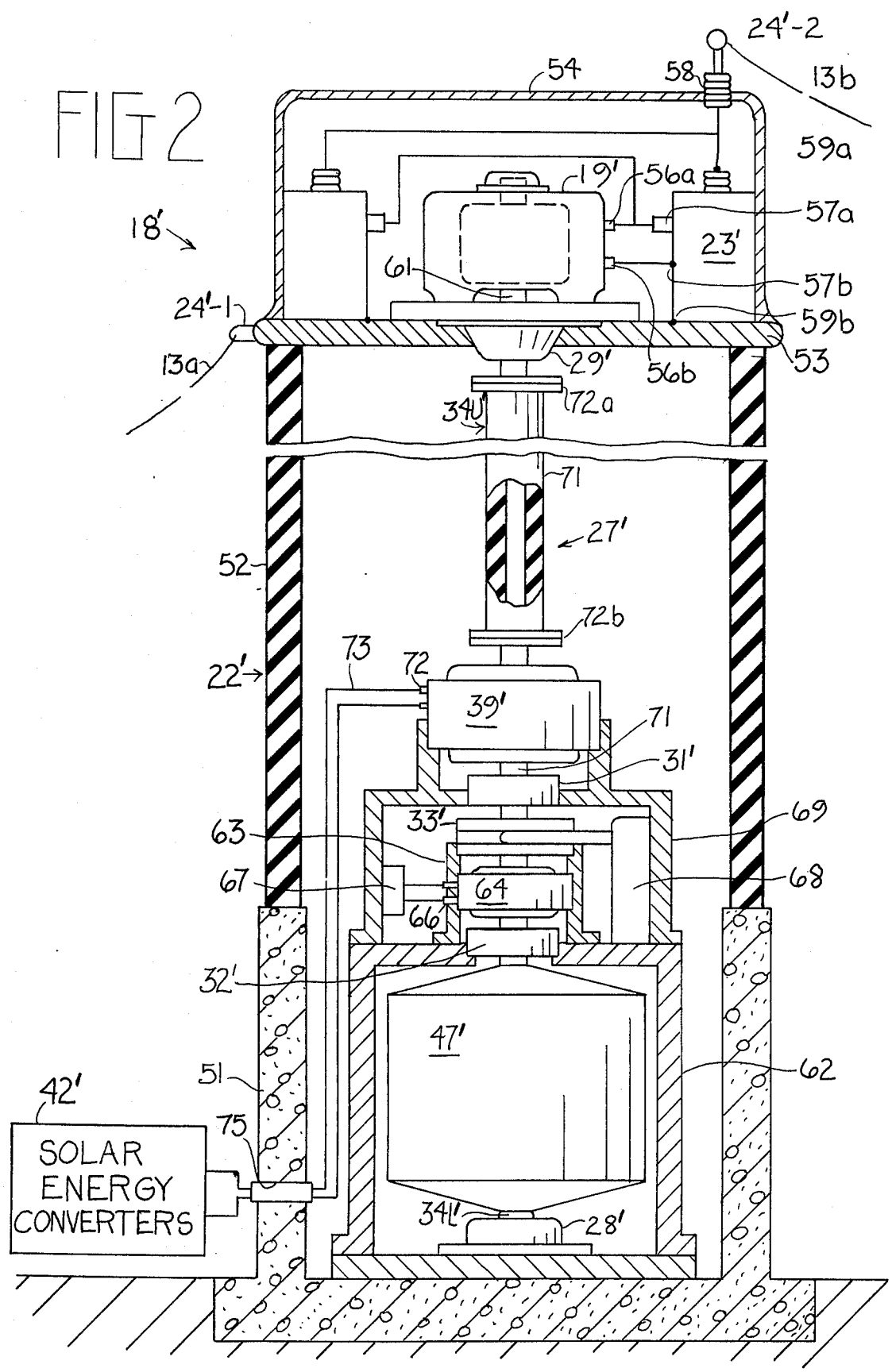

ELECTRICAL POWER-GENERATION APPARATUS WITH ROTARY VOLTAGE TRANSFORMER AND INTEGRATED INERTIAL ENERGY STORAGE

BACKGROUND OF THE INVENTION

This invention relates to the production of electrical power in large quantitites and more particularly to a powergenerating system and a generating station construction therefor wherein power is stepped up to high line voltages by a rotary mechanism which includes inertial energy storage means for accommodating the cyclical imbalances between energy source output and power utilization demands.

Copending application Ser. No. 505,787 of the present applicant filed Sept. 13, 1974 and entitled ELECTRICAL POWER GENERATION AND DISTRIBUTION SYSTEM discloses a system in which high-voltage electrical energy may be more economically generated and delivered to a city or other powerconsuming site from a number of remote scattered energy sources such as geothermal steam wells, solar energy panels, fuel cells powered from natural gas sources, or others. The system of copending application Ser. No. 505,787 differs from more conventional power production installations by eliminating any need for large costly high-voltage transformers to step up the voltage produced by a generator to the relatively high level carried on the associated cross-country transmission lines. In the system of this copending application, individual stations typically consist of one or more generators mounted on an elevated insulative structure and operated from local primary energy sources through insulative drive means. Owing to the electrical isolation of the generators from ground, successive ones of the stations may be series-connected into a cross-country transmission line without requiring large high-voltage step-up transformers. Each successive component station adds an increment of voltage to the transmission line to build up to the very high voltage which is desirable for cross-country power delivery to a distant utilization site. Such a system makes it economically practical to draw upon scattered, remote, small primary energy sources which cannot be efficiently harnessed by conventional techniques.

Certain types of small primary energy source upon which such a system can potentially draw have the disadvantage of being intermittent. Solar energy cells spread over a land area are, at best, effective only during the daylight hours. Wind-driven generators are subject to the vagaries of meteorological conditions. The demand for power from generating systems usually follows a different cyclical pattern and this complicates the utilization of such energy supplies. Except for this problem, the use of these energy sources has many advantages over reliance on more conventional supplies. Solar energy and wind energy, for example, are essentially inexhaustible in contrast to the fossil fuels widely relied upon at present. Environmental problems are relatively minor. Among other advantages, the best siting of power installations drawing on such sources may be in deserts and other geographical areas which are not extensively utilized for urban, industrial or agricultural purposes.

One technique for reconciling differences in power production cycles and peak power demand cycles is to use energy from the intermittent sources to pump water uphill from a natural body of water or a reservoir to a higher reservoir. The pumped water may then be returned through hydroelectrical facilities as necessary to generate electrical power during periods when the primary sources are inactive or operating at a low level inadequate to meet demand. While this is a satisfactory resolution of the problem in many cases, it requires a suitable geographical site including extensive land areas and sizable water supplies and may be highly costly to construct.

Problems with imbalances between supply and demand due to cyclical factors in power systems are not limited to situations where primary energy sources are intermittent. Power utilization sites such as city utility systems for example typically exhibit sizable demand fluctuations. Designing the power generation system to accommodate to the peak loads requires that much of the system be idle during other periods with consequent adverse effects on efficiency and costs. One technique for alleviating this problem which has heretofore been proposed involves storing excess energy produced during periods of slack demand in large rotating flywheels and then reconverting the stored energy into electrical power during peak-load periods. Such a system is described in an article entitled "Flywheel," by Richard F. Post et al in the publication Scientific American, Volume 229, No. 6, pages 17 to 23, December, 1973. It is therein proposed to couple flywheels to an otherwise conventional generating system through dynamoelectric devices which function as driving motors for the flywheels during periods of reduced power demand and which function as generators during peak demand periods.

While such a system offers many operational advantages, it requires sizable increases in the construction cost of the generation system as a whole. Additional large high-voltage step-up transformers must be added to the system to couple the flywheel stations into the transmission lines and additional large motor-generator devices are needed.

The recovery of energy from scattered small intermittent sources would be more economical and more practical and fluctuations in demand would be more efficiently adjusted to if temporary energy storage capacity can be made available within individual generating stations without requiring large land areas, specialized sites or highly costly supplementary equipment.

SUMMARY OF THE INVENTION

This invention provides an electrical power-generation system and a construction for individual component stations thereof which facilitates the gathering of energy from primary supplies which may variously be intermittent, geographically scattered, and possibly remote from the powerconsuming region. The system also accommodates more efficiently to cyclical imbalances between power demand and the output from non-intermittent primary energy sources.

The generating system employs a plurality of individual generating stations each of which may be situated near a primary energy source such as an array of solar energy conversion panels, wind-driven generators, or the like. Each such station may include one or more electrical generators which are supported, usually at an elevated position, by an electrically insulative structure. One or more drive motors at each station are operated from the local primary energy sources and in turn drive the generators through a drive shaft or the like which is formed at least in part of electrically insulative material so that the generators are electrically isolated from ground and from the driving motors and the primary energy sources. Successive ones of the stations, which may be of progressively increasing height, are series-connected into a cross-country transmission line so that the generator or generators at each station add an increment of voltage and power to the line to build up to the desired high voltage on the transmission line. Since the insulative support structure for the generators together with the insulative drive shaft eliminates any requirement for large costly high voltage step-up transformers at each station, the station structure may be characterized as a rotary high-voltage transformer.

According to the present invention, temporary energy-storage capability is provided at each station by including a massive flywheel on the drive shaft assembly which links the drive motor and generator of the station. Thus during periods of high energy output from the local primary sources, the drive motor may be used to accelerate the flywheel and some or all of the locally developed energy output may be thereby stored in the flywheel. When energy production by the local sources drops off or temporarily ceases, energy is transferred back from the flywheel to continue to drive the station generator. Where a number of such stations are present in the generating system, the rate of power delivery to a distant utilization site may be regulated and controlled to correspond with demand. In systems which do not rely on intermittent primary energy sources, the station construction efficiently provides for the temporary storage of excess energy during periods of slack demand for delivery during periods of peak demand.

Accordingly, it is an object of this invention to provide compact, efficient and economical means for accommodating to cyclical imbalances between the production and consumption of electrical energy.

It is an object of this invention to facilitate the generation of electrical energy from scattered primary energy sources which may not be economically usable by means of conventional apparatus.

It is another object of the invention to provide an electrical power-generation system and a component station construction therefor particularly adapted to the production of power from intermittent primary energy sources.

It is still another object of the invention to make practical the recovery of energy from sources which are essentially inexhaustible and which present minimal environmental problems but which may be scattered, remote from a utilization site, individually small and possibly intermittent.

It is still another object of the invention to provide an electrical power-generation station construction which does not require massive costly high-voltage step-up transformers for connection to a high-voltage power transmission line and which requires no external energy storage system in order to store power developed during periods of peak production for delivery during periods of low or no production.

The invention together with further objects and advantages thereof will best be understood by reference to the following description of preferred embodiments taken in conjunction with the accompanying drawings.

BRIEF DESCRIPTION OF THE DRAWINGS

In the accompanying drawings:

FIG. 1 is a diagrammatic view of an electrical power-generation system embodying the invention, and FIG. 2 is an elevation section view of a typical individual component power-generating station in which rotary high-voltage transformer means are integrated with inertial energy storage means.

DESCRIPTION OF THE PREFERRED EMBODIMENTS

Referring initially to FIG. 1 of the drawings, electrical power from a generating system 11 is customarily delivered to a power utilization system 12 through a cross-country transmission line 13 which may consist of one or more high-voltage conductors 14 supported by spaced-apart towers 16 through insulators 17. The power utilization site 12 may variously be an urban or rural electrical utility system or one or more industrial plants requiring large amounts of energy for internal operations. The power transmission line 13 may in many cases be of considerable length in order to bring power to the utilization site from a distant location.

As depicted in FIG. 1, transmission line 13 is a DC or direct current line and therefore may have a single active conductor 14 although more than one such conductor 14 may be present where the amounts of power to be transmitted exceed the capacity of the single conductor. While a DC system is shown for purposes of example, the invention is equally applicable to AC or alternating current power systems.

Power-generating system 11 normally employs a series of individual generating stations 18 of which only an initial three, stations 18a, 18b and 18c respectively, are depicted in FIG. 1 for purposes of example. The additional stations may have essentially similar constructions and be similarly coupled to the transmission line 13.

In contrast to the conventional coupling of power-generating stations to an associated transmission line through large costly high-voltage step-up transformers, the successive stations 18 of generating system 11 are simply connected in series into the transmission line 13 so that each may add an increment of voltage to the total which is established on the transmission line. In a large system where the transmission line 13 is to deliver 150 megawatts of power at 600,000 volts DC to the power utilization site 12, each individual station 18 may typically contribute ten megawatts while boosting the line voltage by 40 kilovolts. Such a system would typically employ a minimum of fifteen individual stations 18 which, if necessary, may be situated at widely spaced locations, as one advantage of the present generating system 11 is that it is adapted to draw on many relatively small, geographically distributed primary energy sources in contrast to conventional power-generation stations which are usually relatively large and dependent upon concentrated primary energy supplies.

Considering now the basic components of a typical one of the individual generating stations, second station 18b in particular, one or more rotary electrical generators 19 are supported at an elevated position relative to ground by a structure 22 which is formed at least in part of electrically insulative material so that the generator 19 and other components at the top of the station may operate at a high base voltage level. Alternating current generators 19 of conventional construction are used in this example of the invention, each including a stator 21 and rotor 25. The generator 19 is connected to a rectifier 23 which has output terminals 24 series-connected into transmission line conductor 14. Rectifier 23 is also supported on insulative structure 22 and is thereby electrically isolated from ground.

While AC generators 19 are used in this example, it is also possible to employ DC generators which may be directly connected into transmission line 13 without requiring rectifiers 23.

Unlike station 18b and the subsequent stations in the series, one output terminal 24-1a of the first station 18a may be connected to ground. The other output terminal 24-2a of first station 18a connects with the opposite polarity terminal 24-1b of second station 18b which in turn has the other output terminal 24-2b connected to the opposite polarity terminal 24-1c of the third station and this connection sequence is repeated at each station 18 of the system.

Generator 19b is supported with the axis of rotation of rotor 25b directed vertically in order to connect with a rotatable drive shaft assembly 27b which extends downward from the generator within structure 22. Shaft assembly 27b is supported for rotation by bearing means which may include a thrust bearing 28b at the top of the shaft assembly, another thrust bearing 29b at the base of the assembly and intermediate guide bearings 31b and 32b at spaced-apart levels between the thrust bearings. Shaft assembly 27b includes a disengagable clutch coupling 33b situated between guide bearings 31b and 32b so that an upper portion 34U of the shaft assembly may be selectively decoupled from a lower portion 34L of the assembly for purposes to be hereinafter described.

Energy to drive the generator 19b is derived from primary energy source 37b in the vicinity of the individual station 18b and may take a variety of forms. The primary energy source 37b for station 18b as depicted in FIG. 1 is a group of wind-driven generators 38. Wind-driven generators 38 are connected in parallel to an electrical drive motor 39b disposed coaxially with respect to generator 19b and which has a rotor 41 that forms a segment of drive shaft assembly 27b above the uppermost guide bearing 31b. Wind-driven generators 38b in this example and drive motor 39b are DC dynamoelectric machines but either or both may also be of the AC form. If generators 38b are of the AC form while drive motor 39b is a direct current device, rectifiers may be used in the interconnection between the two. Conversely, DC to AC converters may be employed where an AC drive motor is used in conjunction with DC primary energy source.

Thus, wind energy is temporarily converted to electrical energy and is then temporarily converted to mechanical energy which rotates shaft assembly 27b to drive the station generator 19b. If clutch 33b is disengaged all such energy is reconverted to electrical power on transmission line 13 except for electrical and frictional losses. A section 40b of the drive shaft assembly 27b between drive motor 29b and upper thrust bearing 29b is formed of electrically insulative material, such as fused silica or various high-stength pyroceramics, to maintain the generator 19b and other components at the top of structure 22b electrically isolated from ground. Thus the generator 19b may be at the high voltage level characteristic of the associated portion of transmission line 13 while the drive motor 39b operates in a region of ground potential, with both the generator and motor requiring nothing more than the ordinary internal insulation provisions customarily provided in such devices. The station 18b construction as described up to this point may therefore be characterized as a rotary high-voltage transformer in that energy is transferred from an adjacent primary source 37b to an associated high-voltage transmission line 13 without requiring the use of large step-up transformers to couple into the transmission line.

As the voltage level at the top portion of each successive stations 18 in the system is progressively higher, the height of insulative support structure 22 and the length of insultive drive shaft section 40 of each successive station may be progressively greater in order to provide the necessary electrical isolation with minimal use of materials. Since the generator 19a of the first station 18a may operate in a region of ground potential, the support structure 22a and drive shaft assembly 27a of that particular station need not include insulative material.

The wind-driven generators or windmills 38b which constitute the primary energy source 37b for the second station 18b described above, are but one example of a suitable energy source. Station 18a of FIG. 1 draws upon an alternate primary energy source 37a which consists of arrays of solar energy converter panels 42 of the known construction which convert radiation from the sun into DC electrical energy. Solar energy panels 42 may be coupled to the drive motor 39a of station 18a in a similar manner to the above-described connection of wind-driven generators 38 to the drive motor 39b of station 18b.

The primary energy sources 37 need not be of an inherently intermittent form such as wind energy or solar energy devices and the drive motors 39 need not always be electrical motors. In the third station 18c depicted in FIG. 1, drive motor 39c is a steam turbine operated from a nearby geothermal steam well 43. As it may be preferable to locate the turbine drive motor 39c at or below ground level, the station 18c construction may differ from that previously described by having the turbine drive motor situated immediately above the lowermost thrust bearing 28c and by having additional guide bearings 45-1 and 45-2 for shaft assembly 27c which are respectively immediately above the turbine and above an additional clutch 50 which is provided for reasons to be hereinafter described.

It will be apparent that other forms of primary energy source 37, such as small hydroelectric installations as one example, may be utilized to supply individual ones of the stations 18 of the system dependent on the nature of energy resources available in the vicinity of the station.

Certain of the primary energy sources 37 described above, such as the solar panels 42 or wind-driven generators 38 are usually intermittent or cyclical sources of energy. The demand for electrical power at a utilization site 12 such as a city utility system, may also fluctuate although there is usually some minimum level of demand which is always present. The periodicity of inermittent primary energy sources does not normally coincide with fluctuations in demand. To resolve this imbalance, generating stations 18 of the system 11 include means for temporarily storing surplus energy produced during the peak production periods of primary energy sources 37 and for subsequently delivering such energy to the utilization system 12 during periods when demand may exceed the output of the primary energy sources. In particular, a rotary inertial energy storage means such as a large flywheel 47 is secured coaxially to the drive shaft assembly 27 within each station 18. Suitable internal constructions for flywheels 47 capable of storing amounts of energy of the magnitude required for the present purposes and for sufficient periods of time are known and have been described, for example, in the publication by Richard F. Post et al hereinbefore identified.

In stations 18a and 18b which have electrical drive motors, flywheels 47 may be disposed coaxially on shaft assemblies 27 between the lowermost thrust bearings 29 and the lowermost guide bearings 32. In station 18c employing a turbine drive, the flywheel 47c is situated between the two clutches 33c and 50 above the uppermost bearing 45-2.

In operation, with clutches 33 and 50 engaged, energy from primary sources 37 operates the drive motor 39 at each station to exert rotational torque on the associated drive shaft assembly 27. Initially, at start-up, most of this energy is stored in flywheels 47. As rotational speed of the drive shaft assemblies 27 increases, an increasing portion of the energy produced by sources 37 is delivered to transmission line 13 by generators 19 and rectifiers 23. Owing to the series connection of successive ones of the stations 18, each station adds an increment of voltage and power to the transmission line.

If the energy being delivered to the system by the primary source 37 at one or more stations 18 then falls below the peak level, station power output continues to be near the peak level for a substantial period of time as energy stored in the flywheels 47 is then transferred to generators 19 through drive shaft assemblies 27. While the rotational speed of the flywheels 47 slows as energy is withdrawn in this manner, sufficient energy can be stored in flywheels of practical size to maintain the electrical power output of the system sufficiently close to peak levels to satisfy demand, during the periods when typical intermittant sources, such as solar energy panels, are inactive.

Owing to fluctuations in power demand, periods will usually occur during which the demand for power at utilization site 12 is less than the aggregate power being produced by the stations 18 collectively. At such times, one or more of the stations 18 may be disconnected from the transmission line 13 for example by closing a normally open switch 49 connected across the station output terminals 24. The full energy output of the associated primary source 37 is then stored in the flywheel 47 of the disconnected station. After the flywheel has reached maximum rated speed, frictional losses may be reduced by disengaging clutch 33 or in the case of the station construction 18c by disengaging both clutches 33c and 50. Subsequently, at a time when the demand for power at utilization system 12 exceeds the collective rate of energy production by primary sources 37, energy previously stored in the flywheel 47 is used to drive generator 19 by re-engaging the clutches and by opening switch 49.

At times when power demand closely approximates the production from primary sources 37, the stations exhibit a stabilizing effect by compensating for minor demand fluctuations which may occur. Under those circumstances, energy either flows out of the flywheels 47 to the generators 19 or into the flywheels 47 from drive motors 39 depending on whether the energy arriving at drive motors 39 from primary sources 37 is less than or more than the energy being delivered to transmission line 13 by the associated generator 19. In particular, if a drive motor 39 is receiving energy from the associated primary source 37 at a rate exceeding the rate of energy delivery to line 13 by the associated generator 19, then there is an inflow of energy into the associated flywheel 47. Conversely, if the energy arriving at drive motor 39 is temporarily insufficient to meet demand, then there is an outflow of energy from the flywheel 47 to generator 19 to meet the excess demand.

Thus while the generating system 11 has been described primarily as a means for efficiently recovering energy from primary sources whih may be intermittent or highly variable, it is also useful where demand, rather than supply, is the more cyclical factor. Station 18c of FIG. 1, for example, draws upon a primary energy source 37c, geothermal steam well 43, which is not intermittent. The inertial energy storage capability enables the system to supply a cyclical utilization site 12 which exhibits a variable demand for power that may at times exceed the collective energy delivery rate of primary energy souces 37 which are not necessarily intermittent. A portion of the constant energy output of primary sources such as source 37c may be temporarily stored in the flywheels 47 of the associated stations for eventual delivery to the transmission line 13 at other times when demand exceeds the output of primary sources.

It is unlikely that the fossil fuel concentrations, large hydroelectric facilities and the like which are the primary energy source for more conventional electrical power generation systems will be able to satisfy increasing demands for electrical energy. Much effort is currently under way to develop alternative energy sources. Such sources as solar energy, wind energy, geothermal energy and certain others are recognized to be highly preferable to more conventional energy resources in many ways. Solar energy and wind energy, for example, are inexhaustible. Geothermal energy is not dependent on the consumption of a fuel and presents relatively few environmental problems. The difficulty of harnessing such energy supplies has been that the sources are in many instances widely distributed over an area of land and often are in remote locations. Such sources may be relatively small, individually, and are often intermittent. The generating system 11 described above is particularly well adapted to produce electrical power from sources of these particular types. Individual ones of the generating stations 18 may be relatively small in comparison with conventional power-generation installations and there is not requirement that the component stations of the system be closely grouped or arranged in any specific pattern from a geographical standpoint. The sitting of the component stations 18 may bearranged as necessary to accommodate to the location of the primary energy sources 37 wherever these may occur.

A generating system 11 of the form described above is particularly suited to certain specific geographical areas of the world, although by no means limited to such specific areas. In Southern California, for example, there is an extremely large urban area with correspondingly large and growing electrical power demands. These demands are becoming increasingly difficult to meet with conventional power-generation facilities because of fuel scarcity and in view of concerns over environmental problems. Close to this urban area is an extensive, sparsely populated desert largely unutilized for agriculture, industry or other economically productive purposes. As in certain other desert areas of the world, this region consistently receives intense solar energy, high-velocity winds consistently sweep certain portions of the area, and there are known geothermal energy reserves at various locations within the region. Further, high-capacity cross-country power transmission lines already traverse this desert. These conditions collectively represent an optimal usage of the generating system 11 described above.

Considering now a suitable detailed construction for a typical individual component station 18' of the generating system, reference should be made to FIG. 2. The station 18' may include a rectangular tower structure 22' having a concrete base 51 forming the floor, foundation and the lower portion of the walls of the structure. Side walls 52 formed of a high-strength electrically insultive material, such as structural plastics or concrete which is free from continuous electrically conductive reinforcement, extend upward from base 51 to a generator housing platform 53 which spans the top of the side walls. A protective enclosure 54 for high-voltage components at the top of the station is disposed above platform 53. Platform 53 and enclosure 54 are formed of electrically conductive material, such as steel, and preferably have rounded edges and corners to inhibit corona discharges.

Generator 19' is secured in a centered position on platform 53, within enclosure 54, the generator being of the form having a vertical rotational axis and being an AC generator in this particular example. The output terminals 56a and 56b of generator 19' are electrically connected to the AC input terminals 57a and 57b of current rectifiers 23' which are situated within enclosure 54. One generator output terminal 56b and on rectifier input terminal 57b are electrically connected to platform 53.

Transmission line conductor segment 13a from the preceding lower-voltage station in the system may connect directly to platform 53 at a suitable terminal 24'-1. The line conductor segment 13b leading to the next higher-voltage station in the system connects to a station output terminal 24'-2 which extends into enclosure 54 through an insulator 58 to connect with one DC output terminal 59a of rectifiers 23', the other DC output terminal 59b of the rectifiers being connected to platform 53.

Accordingly, the base voltage level at the top of station 18' at platform 53 and enclosure 54 is the voltage received from the preceding station in the system through incoming transmission line segment 13a. Output terminal 24'-2 delivers a higher base voltage to the next station in the system as determined by the additional voltage increment contributed by generator 19' and rectifiers 23'.

The rotor shaft 61 of generator 19' extends a short distance downward though thrust bearing 29' which is mounted in an opening in platform 53, the bearing being oriented to support the weight of the upper portion 32U' of drive shaft assembly 27' which extends vertically within the station between the high-voltage region at the top and the ground potential region at the base.

The lower portion 34L' of drive shaft assembly 27' may be formed of material selected for strength without regard to electrical conductivity, such as steel, and has a lower end journaled by thrust bearing 28' which is centrally situated on the floor of the station and oriented to support the weight of the lower portion of the shaft assembly including elements such as flywheel 47' which are carried on the lower portion of the shaft assembly.

To store excess energy during periods when supply exceeds demand and to release the stored energy under other conditions, the large flywheel 47' is secured coaxially to lower portion 34L' of the drive shaft assembly above thrust bearing 28'. Flywheel 47' is enclosed by a cylindrical housing 62 which also serves to support the additional guide bearing 32' that journals shaft portion 34L' immediately above the flywheel. Shaft portion 34L' extends upwardly from bearing 32' to the clutch mechanism 33' for selectively decoupling the flywheel from the higher portions of the shaft assembly. Clutch 33' may be supported by an annular member 63 secured to the top of flywheel housing 62 in coaxial relationship with the drive shaft assembly. The actuating mechanism 68 for clutch 33' may be secured to the top of housing 62 adjacent the clutch.

The portion of the drive shaft assembly 27' which extends between bearing 32' and clutch 33' may be the rotor shaft of an additional relatively small service generator 64 having a stator supported by member 63 and typically being of the type which produces an AC output of 110 or 220 volts. Generator 64' supplies service utility power for electrically operated devices which may be utilized in or around the station 18'. For this purpose the output terminals 66 of generator 64 may be coupled to a service power distribution box 67.

Station drive motor 39' is disposed coaxially above clutch 33' and is held in place by an annular support 69 secured to housing 62. The lower portion of the rotor shaft 71 of drive motor 39' extends downward through guide bearing 31' to couple to clutch 33'. Drive motor 39' is of the DC form in this example and has terminals 72 coupled to a primary energy source in the vicinity of the station, such as solar energy converters 42', by conductors 73 which extend through an opening 75 in the wall of the station. Solar energy converters 42' are shown for purposes of example only and may be replaced by other primary energy sources of the kind hereinbefore discussed. Similarly, although drive motor 39' is described as a DC motor in this example, it may also be an AC motor if the primary energy source supplies alternating current or if a DC to AC converter is connected between the drive motor and primary energy source.

The drive motor rotor shaft 71 is mechanically coupled to the primary generator 19' rotor shaft 61, by an insulative drive shaft section 71 and flanged couplings 72a and 72b at the upper and lower ends respectively of the insulative drive shaft section. To maintain the electrical isolation of components at the top of the station from components at the base, drive shaft section 71 is formed of electrical insulator material such as fused silica, various high-strength pyroceramics or the like. The weight of the insulative drive shaft 71 may be reduced by forming the shaft as a hollow tube since the torsional stresses on a rotary shaft tend to be concentrated in the radially outermost portions of the shaft.

In operation, electrical energy originating at solar energy converters 42' is transmitted to station drive motor 39' through conductors 73 and the drive motor in turn exerts a rotational torque on drive shaft assembly 27'. Initially, a large portion of this energy goes to accelerate flywheel 47' and is stored in the flywheel in the form of mechanical inertial energy. As the drive motor 39' is also coupled to generator 19', a portion of the energy is reconverted into electrical form by generator 19' and then delivered to the transmission line 13 in DC form by rectifiers 23'. As the rotational speed of shaft assembly 27' including the flywheel 47' and generator 19' increases, the power output of generator 19' increases correspondingly and, assuming the energy input from solar energy converters 42' remains constant, an increasingly greater proportion of the input energy is delivered to the transmission line.

If the energy input from solar energy converters 42' then diminishes, the power output of station 18' does not diminish at the same rate as kinetic energy is then transmitted from flywheel 47' through shaft assembly 27' to the rotor of generator 19' to maintain the power output of the station 18' at a high level for a substantial period of time. Utilizing known flywheel constructions such as those discussed in the previously identified publication, it is readily possible to maintain the output of station 18' at a high level throughout the periodic cycles of darkness during which the solar energy converters 42' are inactive.

During periods when the energy output of solar energy converters 42' exceeds the electrical power output requirements of the station and flywheel 47' has been accelerated to high speed, clutch 33' may be disengaged. Flywheel 47' then functions as a temporary energy storage mechanism. Subsequently, when power demand exceeds the rate of energy supply, clutch 33' may be re-engaged to maintain the power output of the station at the desired level.

While the power-generation stations 18 have been herein described as components of a novel generating system 11, one or more such stations 18 may be advantageously coupled into an otherwise conventional power system. A station 18 may be series-connected into an existing crosscountry power transmission line to serve both as a power booster to compensate for line losses and as a stand-by power source to aid in meeting peak loads. Energy stored in the flywheel 47 of such a station during periods of slack demand may be used to supply supplementary power during peak demand periods. This use of generating stations 18 is particularly advantageous where existing cross-country power transmission lines happen to pass near unutilized primary energy supplies such as geothermal steam sources, for example.

Thus, while the invention has been disclosed with respect to certain exemplary embodiments, it will be apparent that many modifications are possible and it is not intended to limit the invention except as defined in the following claims.

What is claimed is:

1. An electrical power production station for connection to a high-voltage power transmission line comprising:
    a generator support structure formed at least in part of electrically insulative material to establish a highvoltage region which is spaced apart from any grounded electrically conductive element,
    at least one electrical power generator disposed on said insulative support structure at said high-voltage region, all portions of said generator being electrically isolated from ground by said support structure,
    a drive motor adapted for operation from an energy source near said station,
    drive shaft means extending to said high-voltage region for coupling said drive motor to said power generator, said drive shaft means being formed at least in part of electrically insulative material to maintain said electrical isolation of said power generator from ground while transmitting driving energy to power generator in kinetic form, and
    inertial energy storage means mechanically coupled to said drive motor and to said drive shaft means.

2. An electrical power production station as defined in claim 1 wherein said inertial energy storage means comprises a flywheel disposed coaxially with respect to said drive motor and said drive shaft means.

3. An electrical power producton station as defined in claim 2 wherein said power generator and said drive motor and said flywheel are each disposed in spaced-apart coaxial relationship along a single rotational axis and wherein said drive shaft means extends along said axis to mechanically couple said power generator and said drive motor and said flywheel.

4. An electrical power production station as defined in claim 3 wherein said generator support structure is a vertical tower have said power generator at an upper portion thereof, and wherein said drive shaft means including said rotational axis thereof extends vertically within said tower to couple said drive motor and said flywheel to said power generator.

5. An electrical power production station as defined in claim 3 wherein said drive motor has a rotor shaft forming a first section of said drive shaft means and wherein said drive shaft has a second section formed of electrical insulator material which couples said first section to said power generator.

6. An electrical power production station as defined in claim 1 wherein said drive shaft means further comprises clutch means for selectively decoupling said inertial energy storage means from said power generator durng periods when the energy output of said energy source exceeds the demand for power from said power production station and said inertial energy storage means has been accelerated to a predetermined rotational speed.

7. An electrical power production station as defined in claim 6 wherein said inertial energy storage means is a flywheel disposed coaxially on said drive shaft means, and wherein said clutch means enables selective decoupling of said flywheel from both said power generator and said drive motor.

8. An electrical power production station as defined in claim 1 further comprising a station service generator coupled to said drive shaft means to be driven therethrough for producing service power for use at said stations.

9. An electrical power production station as defined in claim 8 wherein aid inertial energy storage means is a flywheel disposed coaxially on said drive shaft means, and wherein said drive shaft means further comprises clutch means for decoupling said flywheel from said power generator while maintaining said flywheel coupled to said station service generator.

10. An electrical power production station as defined in claim 1 wherein said drive motor is an electrical motor.

11. An electrical power production station as defined in claim 1 wherein said drive motor is a fluid pressure-driven turbine.

12. An electrical power generating station comprising:
    a vertical tower structure having a high-voltage upper portion and a ground potential lower portion and having an intermediate portion formed of electrically insulative material, at least one electrical generator disposed at said high-voltage upper portion of said tower all portions of said generator being electrically isolated from ground by said intermediate portion of said tower structure, terminal means at said upper portion of said power for electrically connecting said generator in series with a power transmission line, a drive motor disposed in said lower portion of said tower, a rotary flywheel disposed in said lower portion of said tower, and a rotary drive shaft assembly extending vertically within said tower to said high-voltage upper portion thereof and mechanically coupling said drive motor and said flywheel to said generator, at least a portion of said drive shaft assembly which extends within said intermediate portion of said tower being formed of electrically insulative material to deliver driving energy to said generator in kinetic form.

13. An electrical power generating station as defined in claim 12 wherein said generator and said drive motor and said flywheel are coaxial and vertically spaced apart along a single axis of rotation defined by said drive shaft assembly.

14. An electrical power generating station as defined in claim 13 wherein said drive shaft assembly includes clutch means situated between said flywheel and said generator and between said flywheel and said drive motor for selectively decoupling said flywheel from both said generator and said drive motor.

15. An electrical power generation system comprising:

a plurality of spaced-apart generating stations each having at least one rotary electrical generator disposed in a high-voltage region and supported on an insulative structure and each having at least one drive motor coupled to said generator through an insulative drive shaft which extends into said high-voltage region to transmit driving energy to said generator in kinetic form, each of said stations further having a rotary flywheel coupled to said drive motor and to said insulative drive shaft, and a power transmission line interconnecting said stations in series relationship whereby each of said stations adds an increment of voltage and power to said transmission line to collectively establish a high voltage and power level thereon.

16. An electrical power generating system as defined in claim 15 further comprising means for operating said drive motor of each station from nearby sources of energy.

17. An electrical power generation system as defined in claim 15 wherein at least a portion of said generating stations each further comprise clutch means for selectively decoupling said flywheel from said generator.

* * * * *

UNITED STATES PATENT AND TRADEMARK OFFICE
CERTIFICATE OF CORRECTION

PATENT NO. : 4,035,659
DATED : July 12, 1977
INVENTOR(S) : Morris R. Jeppson

It is certified that error appears in the above-identified patent and that said Letters Patent are hereby corrected as shown below:

Column 1, line 10 - "powergenerating" should read --power-generating--.
Column 1, line 13 - "the" should read --to--.
Column 1, line 21 - "powerconsuming" should read --power-consuming--.
Column 6, line 58 - "inermittent" should read --intermittent--.
Column 8, line 51 - "sitting" should read --siting--.
Column 8, line 52 - "bearranged" should read --be arranged--.
Column 9, line 15 - "insultive" should read --insulative--.
Column 9, line 33 - "on" should read --one--.
Column 9, line 58 - "32U'" should read --34U'--.
Column 12, line 20 (Claim 4) - "have" should read --having--.
Column 13, line 8 (Claim 12) - "power" should read --tower--.

Signed and Sealed this

Twenty-ninth Day of November 1977

[SEAL]

Attest:

RUTH C. MASON
Attesting Officer

LUTRELLE F. PARKER
Acting Commissioner of Patents and Trademarks